US010203499B2

(12) United States Patent
Frisken

(10) Patent No.: US 10,203,499 B2
(45) Date of Patent: Feb. 12, 2019

(54) IMAGE PROJECTION SYSTEM

(71) Applicant: Finisar Corporation, Horsham, PA (US)

(72) Inventor: Steven James Frisken, Vaucluse (AU)

(73) Assignee: Finisar Corporation, Horsham, PA (US)

(*) Notice: Subject to any disclaimer, the term of this patent is extended or adjusted under 35 U.S.C. 154(b) by 0 days.

(21) Appl. No.: 15/753,773

(22) PCT Filed: Aug. 22, 2016

(86) PCT No.: PCT/US2016/047969
§ 371 (c)(1),
(2) Date: Feb. 20, 2018

(87) PCT Pub. No.: WO2017/035053
PCT Pub. Date: Mar. 2, 2017

(65) Prior Publication Data
US 2018/0246325 A1  Aug. 30, 2018

Related U.S. Application Data

(60) Provisional application No. 62/208,882, filed on Aug. 24, 2015.

(51) Int. Cl.
G02B 27/01 (2006.01)
H04N 13/341 (2018.01)
(Continued)

(52) U.S. Cl.
CPC ......... G02B 27/0103 (2013.01); G02B 27/01 (2013.01); G02B 27/0149 (2013.01);
(Continued)

(58) Field of Classification Search
CPC ...... G02B 2/01; G02B 2/0103; G02B 2/0149; G03B 2027/0105; G03B 2027/0112;
(Continued)

(56) References Cited

U.S. PATENT DOCUMENTS 8,218,211 B2  7/2012 Kroll et al.
9,715,215 B2 * 7/2017 Christmas .......... G02B 27/0103
(Continued)

OTHER PUBLICATIONS

"Notification of Transmittal of the International Search Report and the Written Opinion in the International Searching Authority, or the Declaration", For International Patent Application No. PCT/US2016/047969, dated Nov. 25, 2016, 17 Pages, ISA/KR, Korean Intellectual Property Office, Daejeon, Republic of Korea.
(Continued)

Primary Examiner — William C Dowling
(74) Attorney, Agent, or Firm — Kurt Rauschenbach; Rauschenbach Patent Law Group, LLP

(57) ABSTRACT

A holographic display image projector system including an input light source for generating an at least partially coherent optical input beam and an imaging system for transforming an image representation in the Fourier domain into a corresponding holographic image in the spatial domain. The image projector includes a spatial light modulator having a reflective phase manipulating surface and being responsive to an electric control signal to generate a two-dimensional phase profile on the reflective phase manipulation surface to diffract the optical input beam into a diffracted beam having a plurality of diffraction components angularly separated in a first dimension. A coupling prism having a first surface positioned such that a first subset of the diffraction components is refracted through the first surface to the imaging system, wherein upon refraction, an angular separation of the first subset of diffraction components is increased by at least a factor of 2.

22 Claims, 15 Drawing Sheets

(51) Int. Cl.
  *G06T 3/00* (2006.01)
  *G09G 3/02* (2006.01)
  *H04N 9/31* (2006.01)
  *G03H 1/22* (2006.01)
(52) U.S. Cl.
  CPC ......... *G03H 1/2205* (2013.01); *G03H 1/2294* (2013.01); *G06T 3/0068* (2013.01); *G09G 3/025* (2013.01); *H04N 9/3126* (2013.01); *H04N 13/341* (2018.05); *G02B 2027/015* (2013.01); *G02B 2027/0145* (2013.01); *G03H 2001/221* (2013.01); *G03H 2001/2207* (2013.01); *G03H 2223/18* (2013.01); *G03H 2225/32* (2013.01); *G03H 2225/52* (2013.01); *G03H 2227/02* (2013.01)
(58) Field of Classification Search
  CPC .... G03B 2027/0125; G03B 2027/0145; G03B 2027/01; G03B 2027/011; G03B 2027/0174
  See application file for complete search history.

(56) References Cited

U.S. PATENT DOCUMENTS

| | | |
|---|---|---|
| 2012/0038819 A1 | 2/2012 | McMackin et al. |
| 2013/0265622 A1 | 10/2013 | Christmas et al. |
| 2014/0313469 A1 | 10/2014 | Ip |
| 2014/0355985 A1 | 12/2014 | Chu et al. |
| 2018/0270457 A1* | 9/2018 | Damberg ............... G02B 26/06 |

OTHER PUBLICATIONS

"Notification Concerning Transmittal of International Preliminary Report on Patentability (Chapter I of the Patent Cooperation Treaty)" for International Patent No. PCT/US2016/047969, dated Mar. 8, 2018, 9 Pages, The International Bureau of WIPO, Geneva, Switzerland.

* cited by examiner

IMAGE PROJECTION SYSTEM

RELATED APPLICATION SECTION

The present application is a 35 U.S.C. § 371 application based on International Patent Application No.: PCT/US16/47969, filed on Aug. 22, 2016, entitled "Image Projection System", which claims priority to U.S. Provisional Patent Application No. 62/208,882, filed on Aug. 24, 2015, entitled "Image Projection System". The entire contents of International Patent Application Number PCT/US16/47969 and U.S. Provisional Patent Application No. 62/208,882 are herein incorporated by reference.

FIELD OF THE INVENTION

The present invention relates to image projection systems and in particular to a heads-up display device for applications such as a vehicle. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Many modern vehicles are incorporating heads-up-display (HUD) devices to more safely display useful information to drivers. HUDs are typically either incorporated into the vehicle dash upon manufacture or added as a separate off-the-shelf dash-mounted module. These HUDs project an image vertically onto the angled windscreen such that a virtual representation of the image is seen by the driver in a lower region of the windscreen. HUDs display useful information to drivers without significantly distracting the driver from the forward road scene. Such useful information includes the current vehicle speed, GPS navigation signals, alerts and indicators.

The dominant technology currently used in HUDs is LED backlit Liquid Crystal Displays (LCDs). These backlit devices necessarily require significant power to sufficiently illuminate the image as a portion of the light is absorbed upon passing through the LCD. These devices also have limitations in terms of contrast and dynamic range. Alternatively the use of mirror matrices (for example, Texas Instruments DLP projectors) can be used in a HUD but they are also inefficient in optical power usage for a display with sparse information such as is common for an instrument display. These technologies do not provide naturally for a variable perceived distance of the virtual object which is of great value in a HUD environment to convey simple information about location of dangers or navigational features such as upcoming intersections.

More recently, phase only holography based HUD systems have been proposed. These systems utilize a Liquid Crystal On Silicon (LCOS) spatial light modulator to generate a holographic image diffraction pattern. Coherent light is projected onto the LCOS and a holographic image is generated at an image plane corresponding to the spatial Fourier transform of the diffraction pattern. More generally a holographic projection scheme is one which utilizes the coherent phase of light to create an optical field that later propagates to form an image. It is in this more general sense that the terms 'holographic projection' and 'holographic image' will be used in this specification. The holographic image is projected onto a vehicle windscreen such that the driver sees a virtual representation of the holographic image at some distance in front of the windscreen. Existing LCOS based holographic projectors rely on complicated, costly and bulky lensing systems (of long focal length) to both remove the zero-order diffraction component (which would significantly degrade contrast by providing a background optical power) and to create an intermediate image of sufficient lateral extent to provide an extended angular field of view. For a given focal length or projection distance, the lateral extent of the intermediate image is constrained by the pixel size due to the physics of diffraction and reducing pixel size can come at a cost of reduced performance. In particular, reduced pixel size can give rise to increased phase flicker, which strongly affects the contrast achievable and the reduction of order artifacts which can arise in holographic projection systems. By way of example, US Patent Application Publication 2013/0265622 to Christmas et al. entitled "2D/3D Holographic Display System" removes the zero-order diffraction component through a spatial filter at the image plane. FIG. 1 illustrates schematically the optical layout of the display system of Christmas et al.

There is a desire in the art for cheaper, more compact HUD projection systems having small throw distances.

SUMMARY OF THE INVENTION

In accordance with a first aspect of the present invention there is provided an image projector for a holographic display system including an input light source for generating an at least partially coherent optical input beam and an imaging system for transforming an image representation in the Fourier domain into a corresponding holographic image in the spatial domain, the image projector including:
  a spatial light modulator having a reflective phase manipulating surface, the spatial light modulator being responsive to an electric control signal to generate a two-dimensional phase profile on the reflective phase manipulation surface to diffract the optical input beam into a diffracted beam having a plurality of diffraction components angularly separated in a first dimension; and
  a coupling prism having at least a first surface and being positioned such that at least a first subset of the diffraction components is refracted through the first surface to the imaging system;
  wherein upon refraction through the first surface, an angular separation of the first subset of diffraction components is increased by at least a factor of 2.

The coupling prism is preferably positioned such that the optical input beam is incident onto the first surface at an angle in the first dimension equal to or greater than the critical angle for total internal reflection and reflected onto the spatial light modulator.

The coupling prism preferably includes a second surface and the optical input beam is preferably reflected sequentially off the first and second surfaces at the critical angle for total internal reflection in a first dimension and coupled onto the spatial light modulator and a second subset of diffraction components is reflected off the first surface and refracted through the second surface.

The coupling prism is preferably triangular in the first dimension having sides defined by the first and second surfaces and a third surface disposed adjacent the spatial light modulator.

In one embodiment, the first subset of diffraction components represents negative orders of a diffraction pattern generated at the phase manipulating surface and the second subset of diffraction components represents positive orders of the diffraction pattern generated at the phase manipulating surface. Preferably a zero order diffraction component is spatially separated from the first and second subsets. In one embodiment the zero order diffraction component is reflected off both the first and second surfaces at the critical angle of total internal reflection. In one embodiment the zero order diffraction component is coupled to a photosensor to monitor the power of the zero order diffraction component. Preferably the photosensor is spatially offset from the input light source in a second dimension orthogonal to the first dimension.

The imaging system preferably includes an optical power element and the coupling prism is positioned to refract the first and second subsets of diffraction components onto the optical power element to produce a holographic image in the spatial domain. The second subset of diffraction components are preferably refracted by the coupling prism directly onto a first region of the optical power element. Preferably an angled mirror is provided for reflecting the refracted first diffraction components to a second region of the optical power element.

In one embodiment the optical power element is a positive lens. In another embodiment the optical power element is a concave mirror.

Preferably the phase profile is a Fourier domain representation of the holographic image. In some embodiments the phase profile includes a pre-distortion factor to at least partially compensate for distortion due to the coupling prism. The pre-distortion factor preferably includes an intensity distortion factor to compensate for intensity distortions due to the coupling prism. The pre-distortion factor preferably includes a nonlinear dispersion distortion factor to compensate for nonlinear dispersion distortions due to the coupling prism.

In one embodiment, the spatial light modulator is responsive to the electric control signal to generate a two-dimensional phase and amplitude profile on the reflective phase manipulation surface.

In one embodiment, the phase profile includes a focusing factor to vary the position of the holographic image in the spatial domain along an optical axis.

The holographic image preferably has a higher resolution in a central region and a lower resolution in peripheral regions.

The spatial light modulator is preferably a Liquid Crystal On Silicon device having a two dimensional array of independently electrically drivable pixels to produce the phase profile.

In accordance with a second aspect of the present invention there is provided a heads-up display system including an image projector according to the first aspect. The heads-up display system is preferably incorporated into a vehicle. The holographic image preferably includes vehicle related indicia.

In accordance with a third aspect of the present invention there is provided a method of controlling an LCOS device to generate a diffraction profile for generating a corresponding holographic image from incident light, the method including the steps of:

a) receiving image data corresponding to the desired holographic image, the image data including a two dimensional array of image intensities;

b) distorting the image data to compensate for one or more of dispersion, nonlinear angular transformation of spatial frequency components and a spatial invention;

c) determine a two dimensional phase matrix in the Fourier domain to approximate the generation of the holographic image; and d) deriving voltages to pixels of the LCOS based on the determined phase matrix.

The step of distorting the image data preferably includes swapping the spatial position of image data in a peripheral region of the array with image data in a central region of the array. The step of distorting the image data preferably also includes increasing the intensity of image data in peripheral regions of the array.

The step of distorting the image data preferably further includes spatially compressing the image data as a function of distance from the center of the array.

The method preferably also includes the step:

e) defining a blocking region at a central region of the array.

BRIEF DESCRIPTION OF THE DRAWINGS

Preferred embodiments of the disclosure will now be described, by way of example only, with reference to the accompanying drawings in which.

DETAILED DESCRIPTION

System Overview

The present invention relates to an image projector subsystem for a holographic display system. The embodiments of the invention described herein are adapted for use in a heads-up display (HUD) type holographic system having applications in modern vehicles. However, it will be appreciated that the field of the present invention extends beyond this exemplary application. For example, the described image projector system could be incorporated into other types of image or video projectors or other HUD devices such as video gaming devices and military defense related systems.

Figure 1:
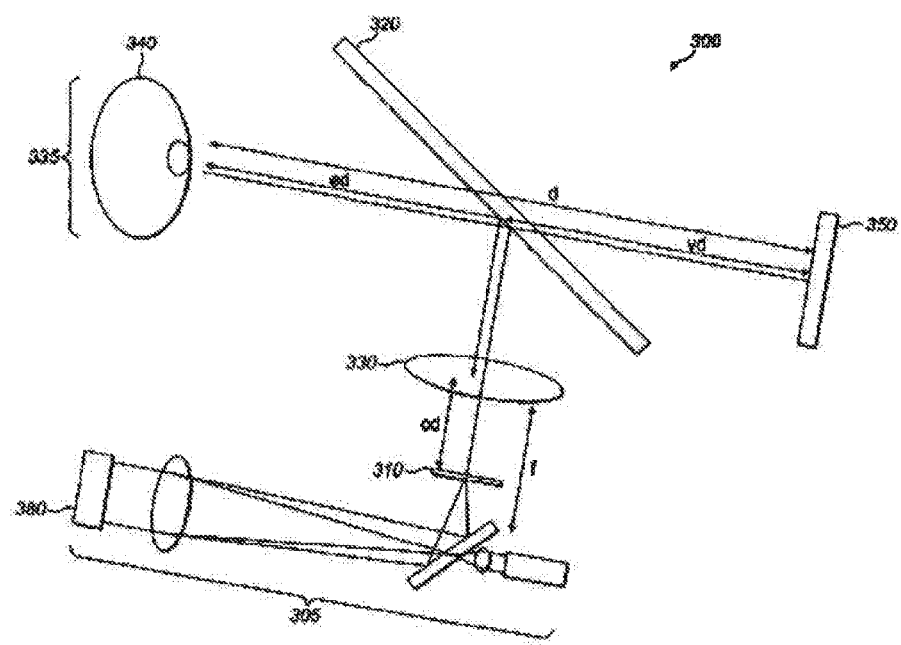
FIG. 1 is a reproduction of FIG. 3 of Christmas et al. illustrating schematically the optical layout of a prior art display system.
Figure 2:
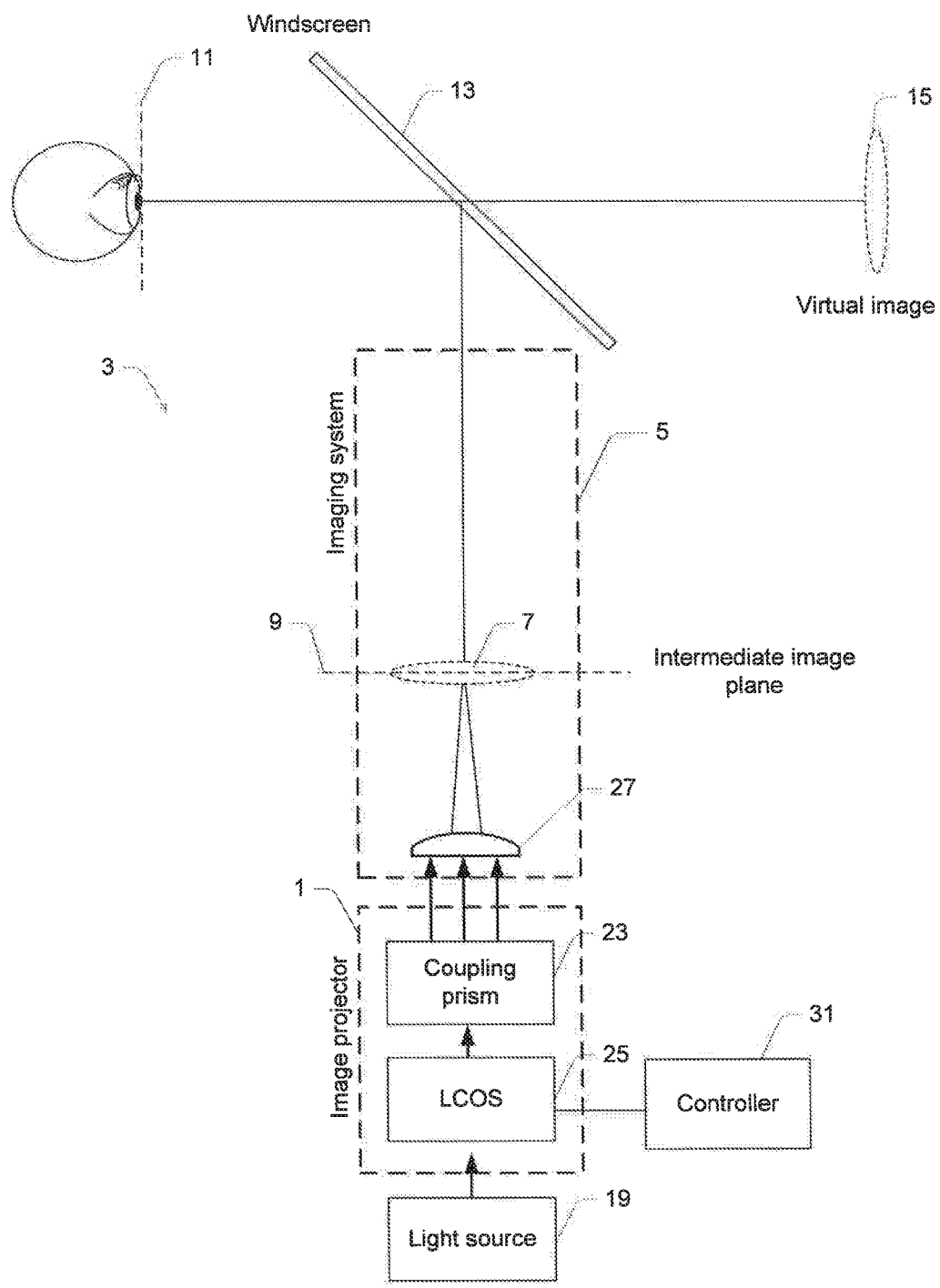
FIG. 2 is schematic illustration of a heads-up display system.

Referring to FIG. 2, the present invention focuses on an image projector 1 of an overlying HUD system 3 to generate, in conjunction with an imaging system 5, an intermediate image 7 at an intermediate image plane 9. Imaging system 5 is also responsible for reprojecting or 'throwing' the intermediate image to a distant image plane 11 for viewing by a driver of the vehicle. HUD system 3 is preferably mounted within the dash of a vehicle and imaging system 5 projects intermediate image 7 vertically onto windscreen 13. The reflection is viewed by the driver who sees the image as a virtual image at a virtual image plane 15 in front of the vehicle.

Figure 3:
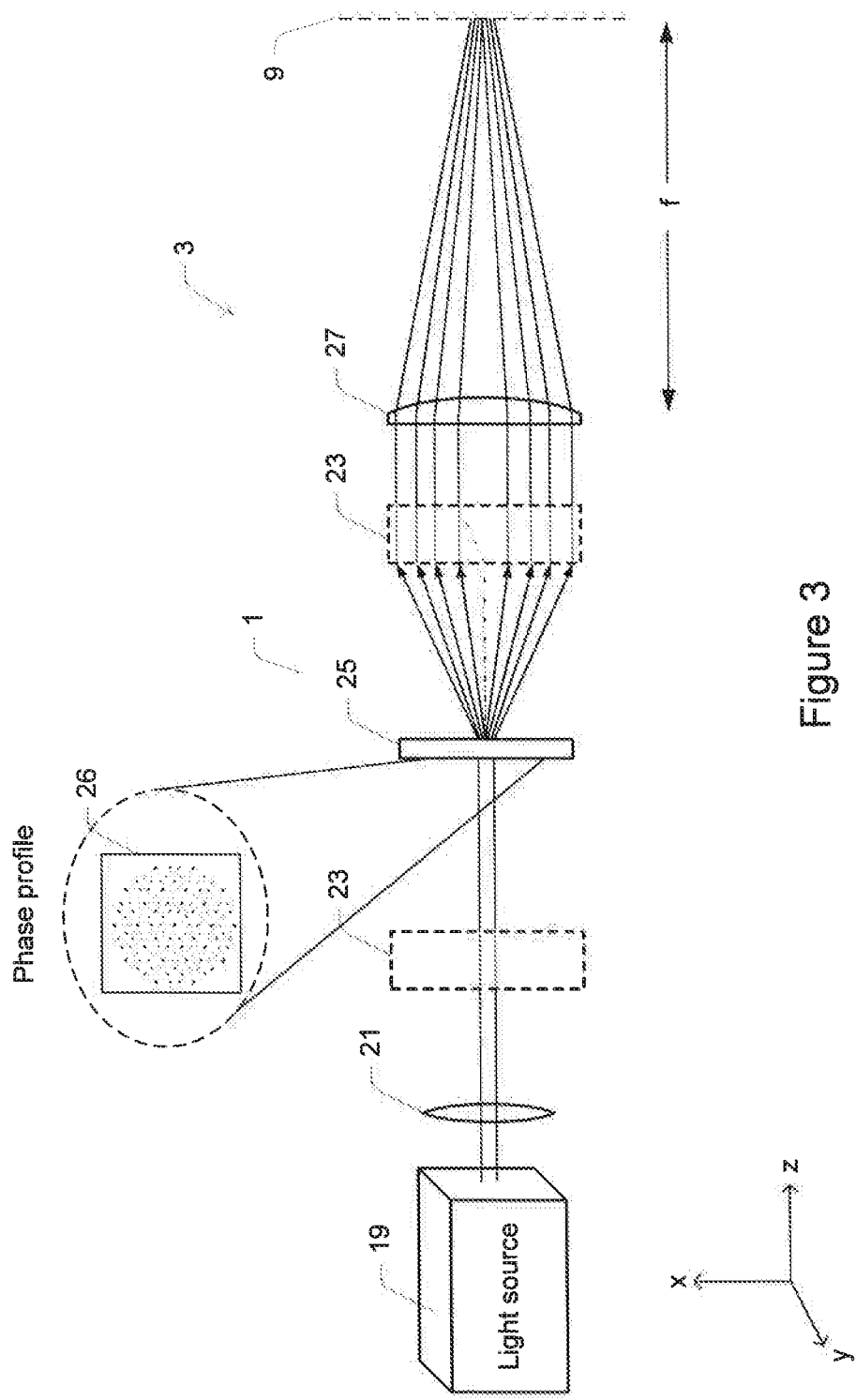
FIG. 3 is a schematic side view of the system of FIG. 2 illustrating the optical train of from light source to an intermediate image plane.

Referring to FIG. 3 there is illustrated a side schematic view of a section of HUD system 3 with emphasis on image projector 1. As illustrated, system 3 includes a light source 19 to input an optical input beam at a desired wavelength and output power. The optical input beam should be at least partially coherent to efficiently form the holographic image. Suitable requirements for coherence are discussed below. Suitable light sources for the invention include lasers and LEDs with narrowband output and some degree of coherence.

Light source 19 provides a single color projection for a monochrome system. In a time multiplexed multicolor system, more than one laser is included, each of which projects a beam of different wavelength through the same projection system. Alternatively, different color inputs could be directed onto separate LCOS devices or separate regions of a single LCOS device. For simplicity, only a monochrome system is illustrated. However, a multicolor system could be implemented with the same optics as described below with the only addition of more than one light source stacked side-by-side and optionally additional LCOS devices. Alternatively, a single tunable light source may be implemented which tunes the output wavelength across multiple output wavelengths in a rapid time division manner. A collimating lens 21 acts to collimate the optical input beam in both the x and y dimensions as illustrated.

The optical input beam is passed through a coupling prism 23, the operation of which will be described in detail below. The optical input beam propagates through prism 23 and onto a spatial light modulator in the form of an LCOS device 25. Device 25 includes a two-dimensional array of independently electrically controllable liquid crystal pixels. Each pixel is drivable by a digital or analogue controlled voltage signal between a number of optical states, each of which impose a different phase delay to a local wavefront of the input optical signal incident thereon. The pixels are deposited on a highly reflective silicon substrate. Together, the reflective silicon layer substrate and liquid crystals define a reflective phase manipulating surface. Preferably the LCOS would provide a phase and amplitude response to accurately capture the optical field information but phase only LCOS are much simpler than phase and amplitude LCOS. Therefore the two-dimensional array of phase only pixels can define a diffraction or phase profile 26 which represents the two-dimensional spatial Fourier Transform of an image which approximates the desired image to be projected at the image plane. This approximate image places no constraints on the phase of the image at the image plane and also may introduce regions of the image plane which will be blocked. These reduced constraints on the image allow for dumping of rejected or unwanted light and permit an optimization such that the intensity profile in the region of interest very closely approximates the desired image.

The optical input beam is reflected off LCOS 25 and diffracted into angularly separated diffraction components based on the current generated diffraction profile. The diffraction components are passed back through coupling prism 23 (again, in a manner that will be described below). In the illustrated embodiment, the coupling lens is positioned such that the diffraction components are coupled to an optical power element in the form of a Fourier lens 27 in the imaging system 5. Lens 27 is a positive lens which acts to focus the diffraction components to the intermediate image plane 9 at its focal length 'f'. Lens 27 operates as a Fourier transformer to transform the Fourier domain image (represented as the phase profile on LCOS 25) into the desired spatial domain image at plane 9. In other embodiments (not illustrated), lens 27 is replaced with a concave mirror having a concavity to provide the same focal length 'f'. In another embodiment (not shown), image projector 1 operates in the far-field and no Fourier lens is required; the diffraction components are coupled directly to intermediate image plane 9.

For efficient generation of a holographic image, the coherence length $L_c$ of the optical input beam should satisfy the following equation:

$$L_c \geq \frac{N_p \lambda}{2},$$

where $N_p$ is the number of pixels of the LCOS in the longest dimension and $\lambda$ is the wavelength of the optical input beam. For example, for an LCOS design having 1024 pixels of pitch 5 mm, a coherence length of greater than about 0.5 mm should be adequate for a wavelength of 700 nm. Thus, suitable light sources for the invention include lasers, Vertical-Cavity Surface-Emitting Lasers (VCSELs) and some narrow band superluminescent diodes (SLEDs).

Returning to FIG. 2, imaging system 5 may include an optical diffuser to produce a wide angle image to be reimaged at the image plane. However, use of a diffuser fixes the intermediate image plane 9 and therefore removes the ability for dynamic depth variation. Alternatively, in the present invention, the intermediate image may be reimaged using appropriate lenses and mirrors such that depth variations to the intermediate image, from predetermined LCOS phase profiles, are translated directly to the image plane 11 and viewed by the driver.

Coupling Prism Operation

Figure 4:
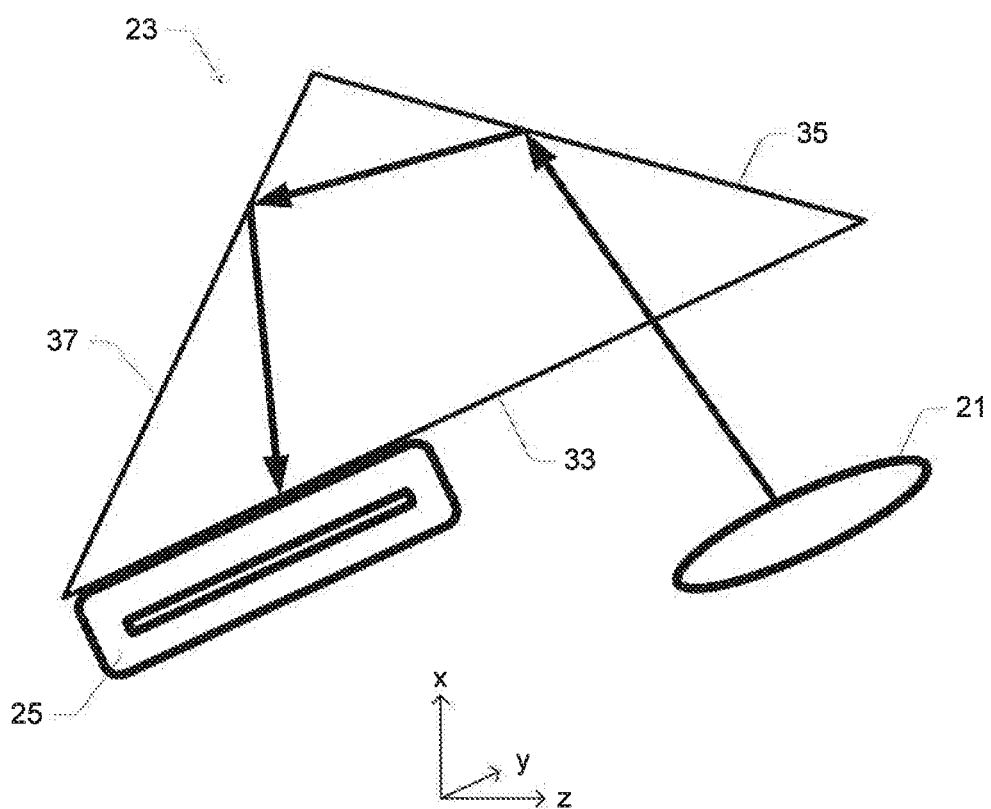
FIG. 4 is a plan view of an image projector according to an embodiment of the invention showing the trajectory of an optical input beam.
Figure 5:
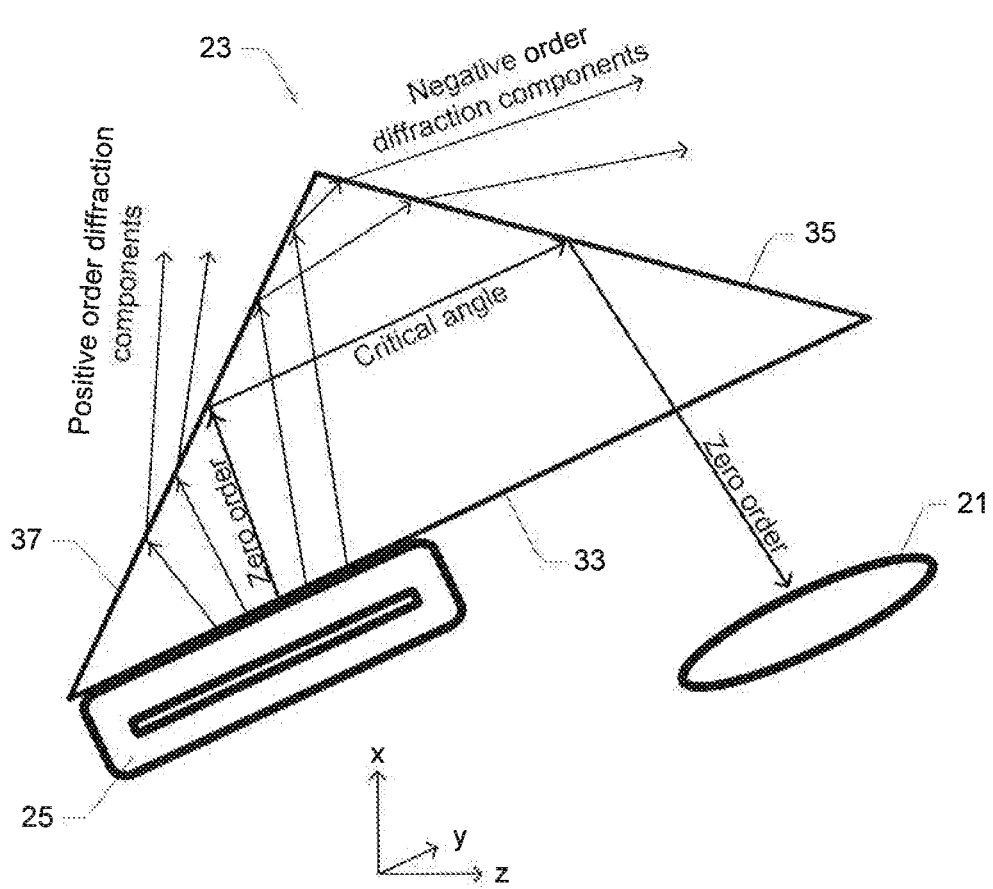
FIG. 5 is a plan view of the image projector of FIG. 4 showing the trajectory of diffraction components.
Figure 6:
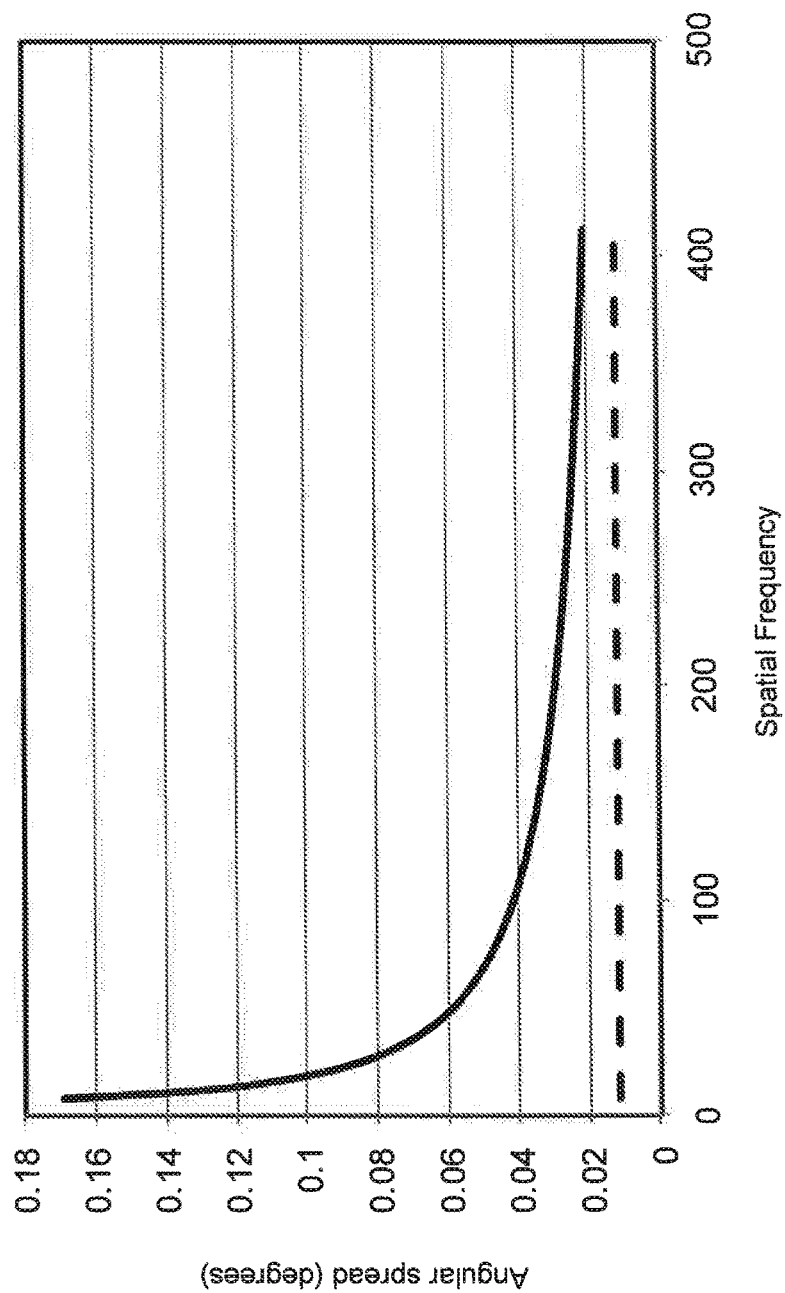
FIG. 6 is a graph of the angular spread of diffraction components upon passing through prism a coupling prism as a function of spatial frequency.

Referring now to FIGS. 4 to 6, the operation of a first embodiment of a coupling prism used in the present invention will be described. Prism 23 is preferably formed of a glass material such as borosilicate glass Schott (BK7). However, prism 23 may be formed from other dielectric materials. Prism 23 is substantially triangular in cross section along the x-z plane of the optical system and having a base (larger side) of approximately 12 mm. Although not shown, prism 23 is preferably substantially uniform in the y axis (out of the page in FIG. 4) and having, in one embodiment, a thickness in that dimension of about 6 mm. As will be appreciated by a person skilled in the art, the dimensions of prism 23 are variable based on the particular system and application. By way of example, a suitable range of the y-dimension thickness of prism 23 is 2 mm to 20 mm and suitable dimensions of prism 23 in the x-z plane are in the range of 5 mm$^2$ to 50 mm$^2$.

Prism 23 includes three sides defined by three surfaces: an input surface 33 allows for coupling of the optical input beam into prism 23; and first and second reflecting surfaces 35 and 37 are positioned to reflect the optical input beam under total internal reflection onto LCOS 25. This is illustrated best in FIG. 4, which illustrates schematically the optical input beam being directed onto LCOS 25 by coupling prism 23. The particular geometry of prism 23 is dependent upon the material used. However, by way of example, for a silica glass prism the angle subtending sides 33 and 37 is about 54.7° and the angle subtending sides 33 and 35 is about 41.8°.

To achieve total internal reflection, surfaces 35 and 37 are oriented such that the input beam is incident onto each surface at an angle in the x-z plane that is equal to or greater than the critical angle for total internal reflection. The critical angle ($\theta_c$) at a surface or boundary is determined from Snell's law and expressed as:

$$\theta_c = \theta_i \sin^{-1}\left(\frac{n_2}{n_1}\right),$$

where $\theta_i$ is the angle of incidence, $n_1$ is the refractive index of the material in which the beam is incident and $n_2$ is the refractive index of the second material forming the boundary or surface. In the case of prism 23 formed of BK7 glass ($n \approx 1.52$) and disposed in an air environment ($n \approx 1$), the critical angle is about 41.1°. Here, angles of incidence and reflection are defined relative to a surface normal.

Referring to FIG. 5, upon incidence on LCOS 25, input beam is diffracted into a plurality of diffraction components based on the particular current diffraction profile displayed on the LCOS. The diffraction components represent optical power in terms of spatial frequency in the Fourier domain. As with any diffraction pattern, the diffraction components are separated into separate orders, which are angularly separated. For simplicity, only a few spatial frequency diffraction components are illustrated. However, it will be appreciated that many components are present simultaneously to represent the Fourier representation of an image. The LCOS diffraction profile can be controlled to suppress higher order diffraction components to reduce image artifacts.

Refraction of the diffraction components at prism surfaces 37 and 35 occurs in a nonlinear fashion giving rise to a nonlinear angular spread between the diffraction components. Lower spatial frequency diffraction components are incident at close to the critical angle and undergo a larger angular deviation (from their original trajectory) while higher spatial frequency diffraction components, which are incident further from the critical angle, undergo a smaller angular deviation. The resulting angular spread of diffraction components upon passing through prism 23 is illustrated as the solid line in FIG. 6. The dashed line represents a system without a prism.

The zero order represents the direct specular reflection component and typically can be a very strong component. The zero order contains the majority of optical power when LCOS pixels are in an undriven state, so it is important to ensure that this cannot be directed to a viewer for safety reasons.

The particular geometry of prism 23 is such that the negative order diffraction components are incident onto second surface 37 at angles less than the critical angle and are thus transmitted through surface 37 at a refracted angle. Conversely, positive order diffraction components are incident onto second surface 37 at angles greater than the critical angle and are thus reflected internally off surface 37 onto first surface 35. These positive orders strike first surface 35 at angles less than the critical angle and are thus transmitted but refracted through surface 35. The refraction of the positive and negative orders at surfaces 37 and 35 magnifies the angular dispersion of the diffraction components.

Figure 7:
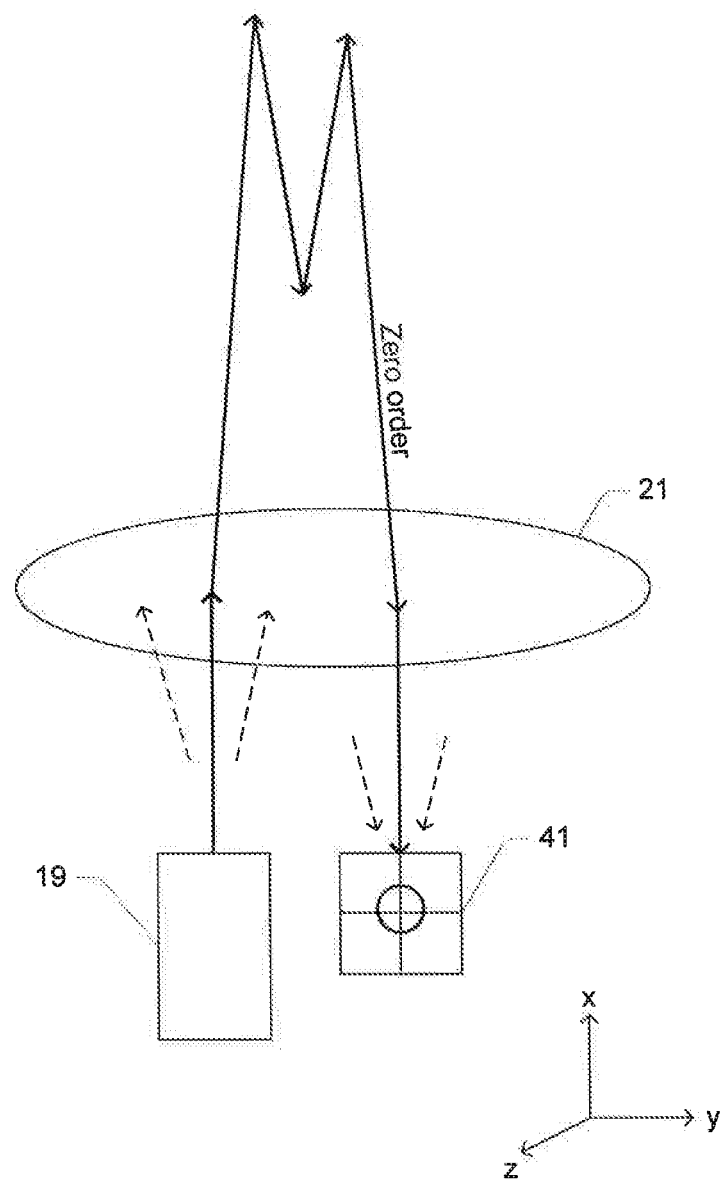
FIG. 7 is a rear view of the image projector of FIGS. 4 and 5 showing the trajectory of an optical input beam and zero order diffraction component.

Prism 23 operates on the zero order component uniquely in that it strikes both surfaces 37 and 35 at angles greater than or equal to the critical angle and is thus reflected off both surfaces. This results in the zero order being reflected back through input surface 33. The returned zero order is separated from the optical input beam by transmitting the input beam at a slight offset from the center of coupling lens 21 in the y dimension, as illustrated in FIG. 7. Here the size of lens 21 and angles of propagation of the optical input beam is exaggerated for ease of understanding. The returned zero order is coupled back through coupling lens 21 at an offset position in the y-axis and coupled to a detector 41. Detector 41 may be a quadrature detector having four photosensitive pixels disposed in an array for allowing determination of the center of the returned beam. This allows monitoring of the power of the zero order for safety of the system in terms of laser light control. Specifically, the amount of optical power detected in the zero order allows estimation of the optical power distributed in the remaining diffraction orders and transmitted to the viewer's eye. An emergency cutoff of the HUD can be implemented in response to detection of significant position shift or reduced zero-order detection (and subsequent risk of zero order being conveyed to a viewer). In other embodiments, the returned zero order may be coupled in other ways or simply attenuated.

Figure 8:
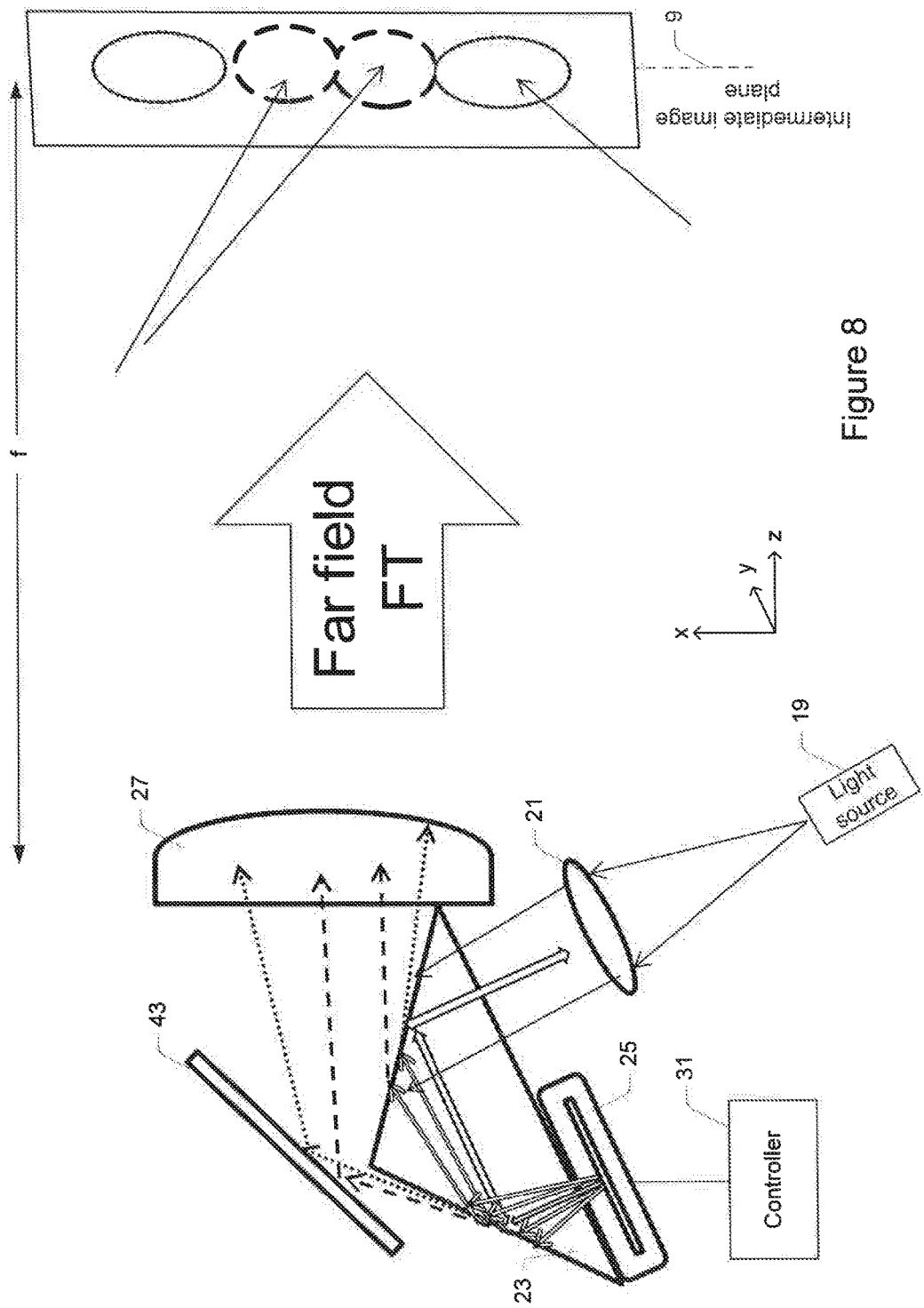
FIG. 8 is an expanded schematic view of the system of FIG. 2.

Referring now to FIG. 8, an expanded schematic view of system 3 is shown. Lens 27 is positioned to receive the positive order diffractive components transmitted from prism 23. These positive orders are incident onto lens 27 at a lower region. An angled reflector 43 is positioned adjacent prism 23 to angularly redirect the negative order diffractive components onto an upper region of lens 27. Due to the particular geometry, lower spatial frequency diffraction components (designated as dotted lines in FIG. 8) are coupled to more peripheral regions of lens 27 and hence receive greater angular magnification. Conversely, higher spatial frequency diffraction components (designated as dashed lines in FIG. 8) are coupled to more central regions of lens 27 and are angularly magnified to a lesser extent than the lower order diffraction components.

Figure 9:
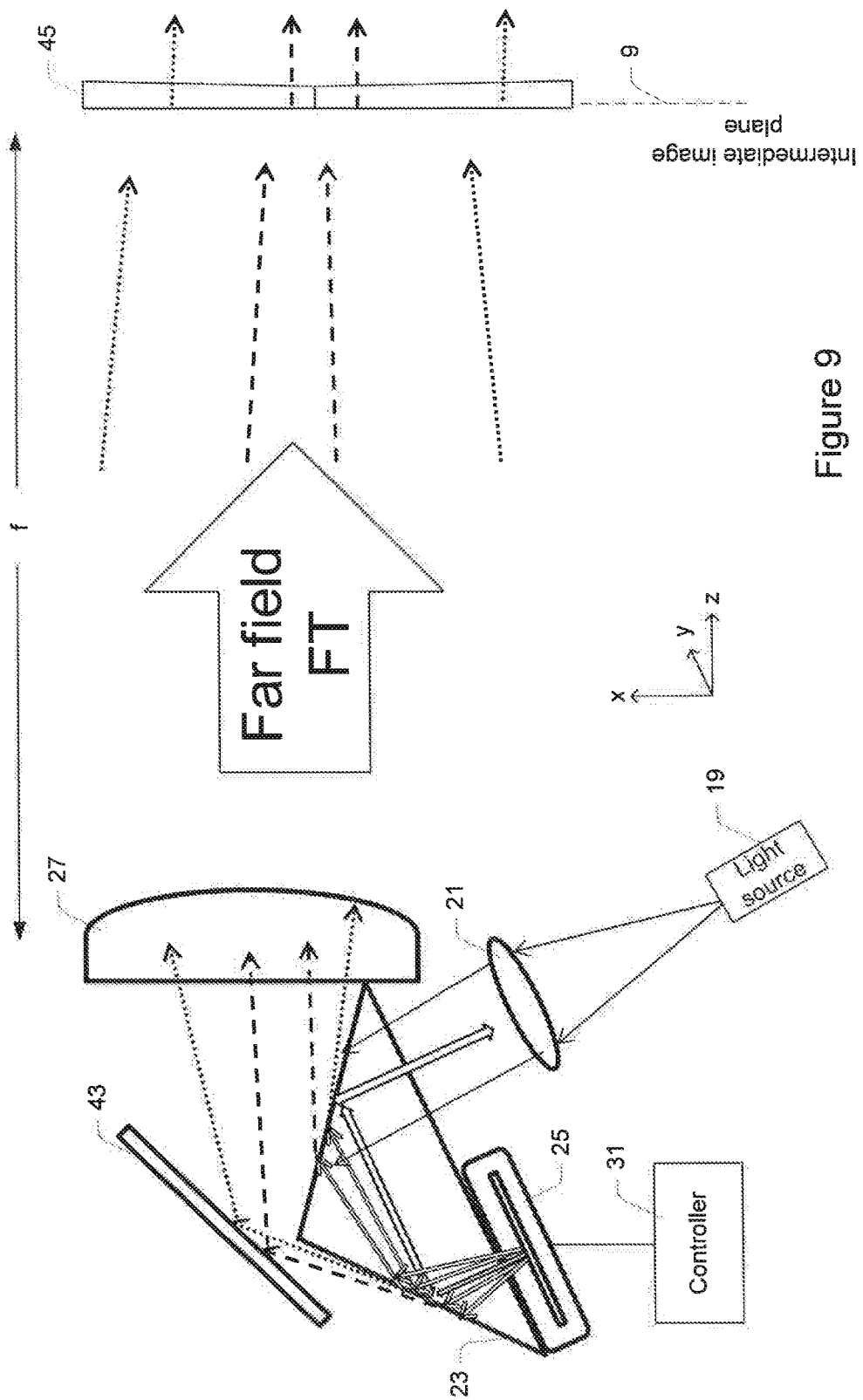
FIG. 9 is an expanded schematic view of a system similar to that of FIG. 2 but including an image diffuser at the intermediate image plane.

Because lens 27 is positioned at a distance from the intermediate image plane 9 equal to its focal length f, lens 27 performs a spatial frequency-to-space conversion such that the real holographic image is generated at image plane 9. The position of prism 23 adjacent LCOS 25 acts to enhance the angular dispersion of the diffraction components from LCOS 25 by a factor of about 3 to 3.5 due to the refraction at surfaces 37 and 35. The amount of enhancement to the angular magnification is dependent upon the difference in angle from the critical angle. Diffraction components refracted close to the critical angle experience a large enhancement in angular magnification.

Where the intermediate image 9 is to be transmitted directly to imaging system 5 without the use of an optical diffuser, an angle adjuster 45 can be placed at intermediate image plane 9 to correct the offset between central rays, as illustrated in FIG. 9. This lack of a diffuser allows variable image plane depth perception at the image plane 9.

LCOS Control

As illustrated in FIGS. 2, 8 and 9, LCOS 25 is driven by a controller 31 to create a dynamic phase profile across the pixels which results in the desired dynamic image being generated at planes 9 and 11. Controller 31 includes one or more computer processors and is responsive to various inputs for dynamically varying the diffraction profile in real-time or near real-time. In some embodiments, controller 31 is linked with a vehicle on-board computer system and inputs are provided through various vehicle electronics and user controls. For example, controller 31 may be responsive to vehicle indicator signals and a current vehicle speed to project corresponding indicators into the driver's field of view. Similarly, controller 31 may be responsive to user input such as a current radio station or music selection playing on the vehicle's audio system.

Furthermore, controller 31 may be responsive to video image data captured by a forward facing camera such as a 'dashcam'. The received video image data may be processed to detect certain patterns in the image such as signs, pedestrians, nearby vehicles and other potential hazards. In response, controller 31 projects a corresponding warning image in the driver's field of view.

In operation, controller 31 sends voltage drive signals to each pixel of LCOS 25 for each image frame to be projected to image plane 11. The voltage signals drive the respective liquid crystal pixels to generate a two-dimensional phase profile in a manner known in the art. For example, Christmas et al. discloses a method of driving an LCOS device to generate Fourier domain phase representation of a holographic image.

In addition to generating the relevant Fourier domain phase profile across the pixels, controller 31 is also able to overlay additional phase profiles for more advanced functionality. In particular, LCOS 25 is also able to provide lensing capability to change the focal position of the diffraction components and hence vary plane 9 to provide variable image depth control. Further, LCOS 25 can pre-distort the Fourier domain phase profile to compensate for distortions that are incorporated by coupling lens 21.

Figure 10:
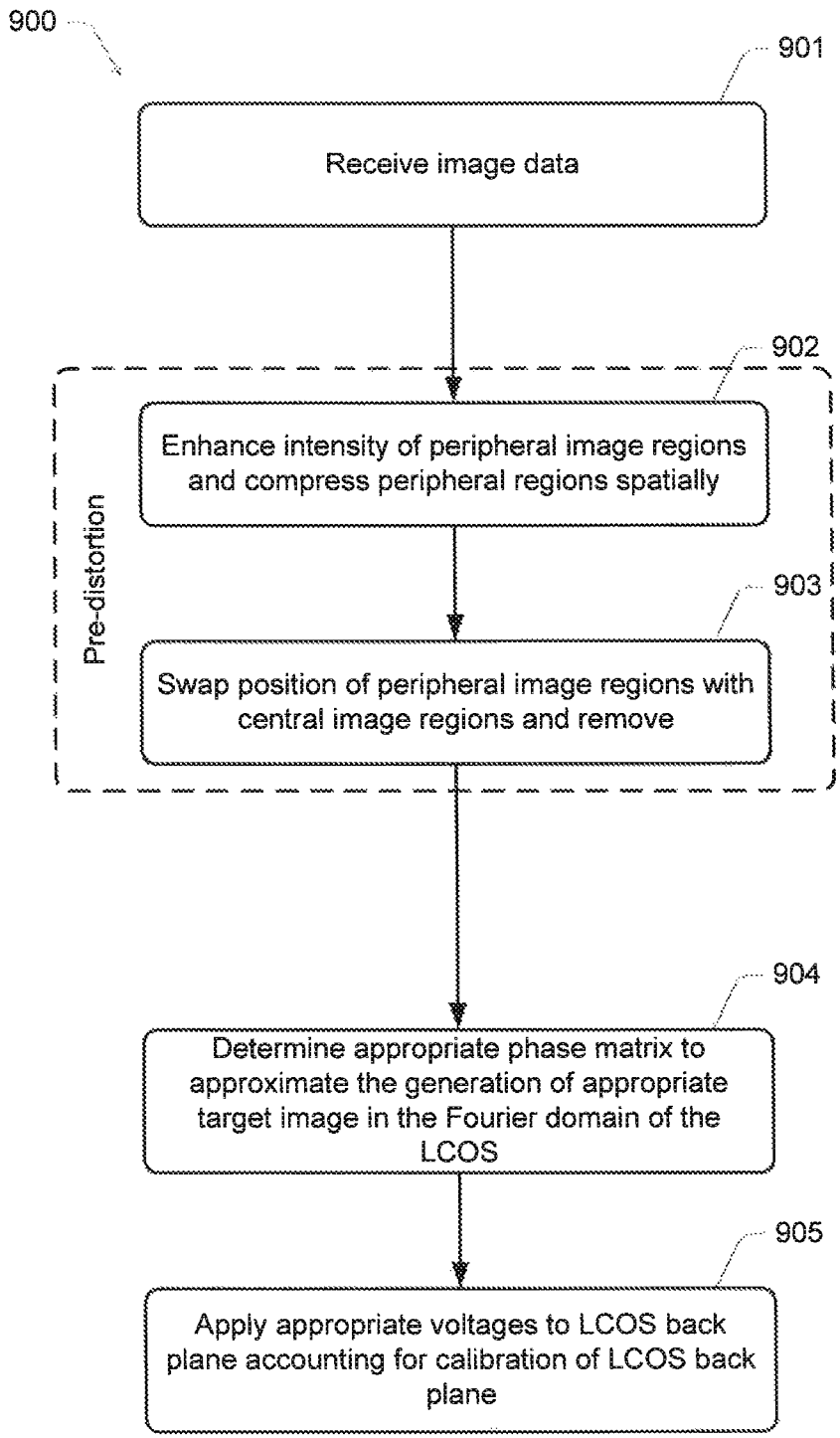
FIG. 10 is a process flow diagram illustrating a process of generating a Fourier domain phase or phase and amplitude profile on an LCOS from input image data.
Figure 11:
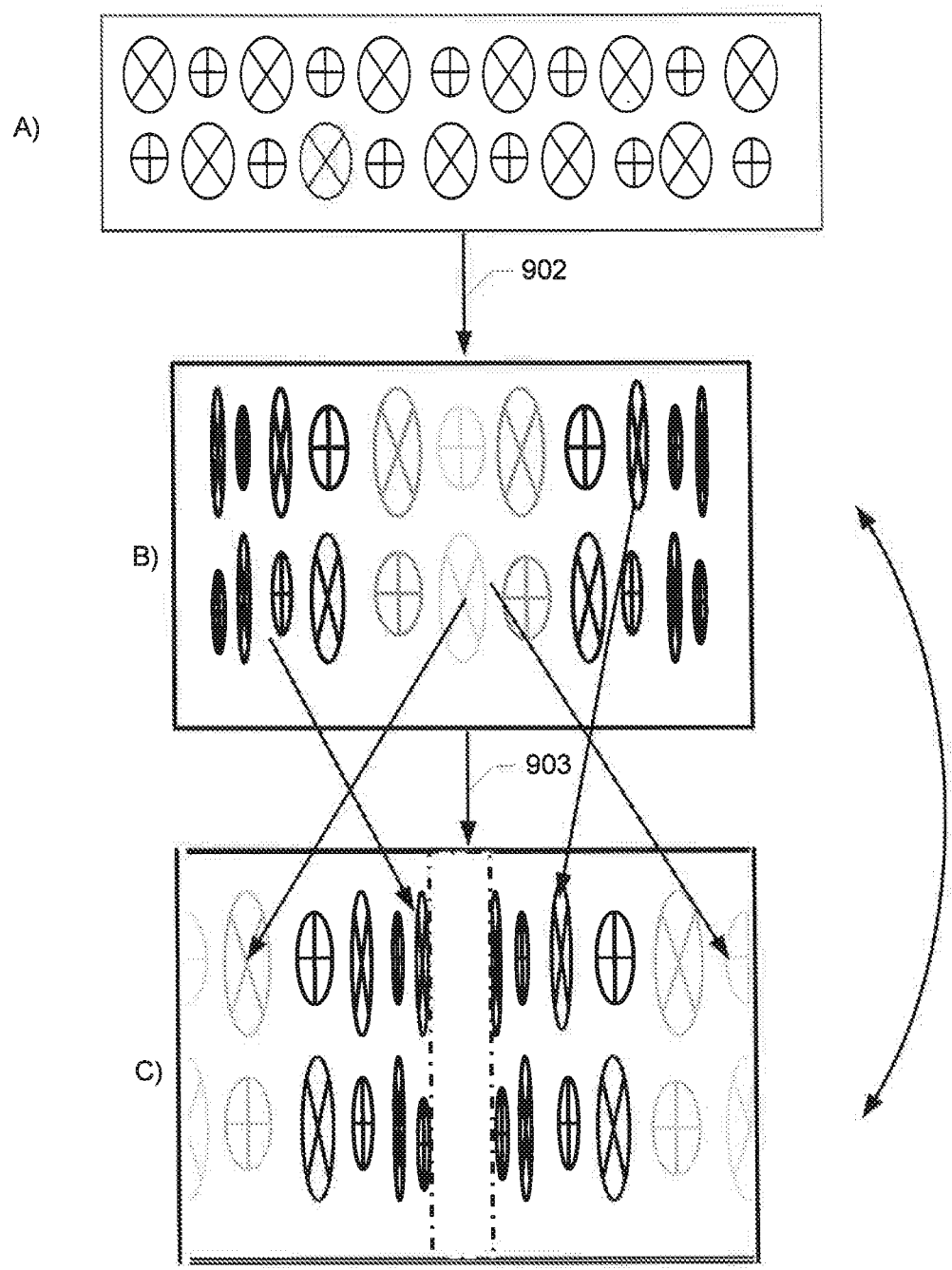
FIG. 11 illustrates three panels showing an exemplary pre-distortion process performed on image data.

A process 900 of generating a Fourier domain phase (or phase and amplitude) profile on LCOS 25 from input image data is illustrated in FIG. 10. At step 901 the image data is received by controller 31. The image data represents a two dimensional amplitude distribution. At steps 902 and 903 pre-distortion of the image data is performed. To illustrate the pre-distortion process pictorially, FIG. 11 shows steps 902 and 903 for a desired image illustrated in panel A). At step 902, the intensity of peripheral image components is increased to compensate for higher dispersion of these components by prism 23. Similarly, the spatial distortion caused by the nonlinear angular transformation can be corrected by using an equal and opposite pre-distortion in the form of spatial compression as a function of distance from the center of the image. This results in panel B). At step 903, the spatial positions of the peripheral image data are swapped with the positions of the central image data to account for an inversion during the spatial Fourier transform process. However, when shifting the peripheral image data to the central region, a central band is kept empty to avoid coupling high power, low spatial frequency components to the holographic image. This central band represents a 'don't care' region in which no constraints are applied to the target image in this region if an aperture is included so that the corresponding image components are blocked from the projected holographic image. The resulting pre-distorted image is illustrated in panel C).

Figure 12:
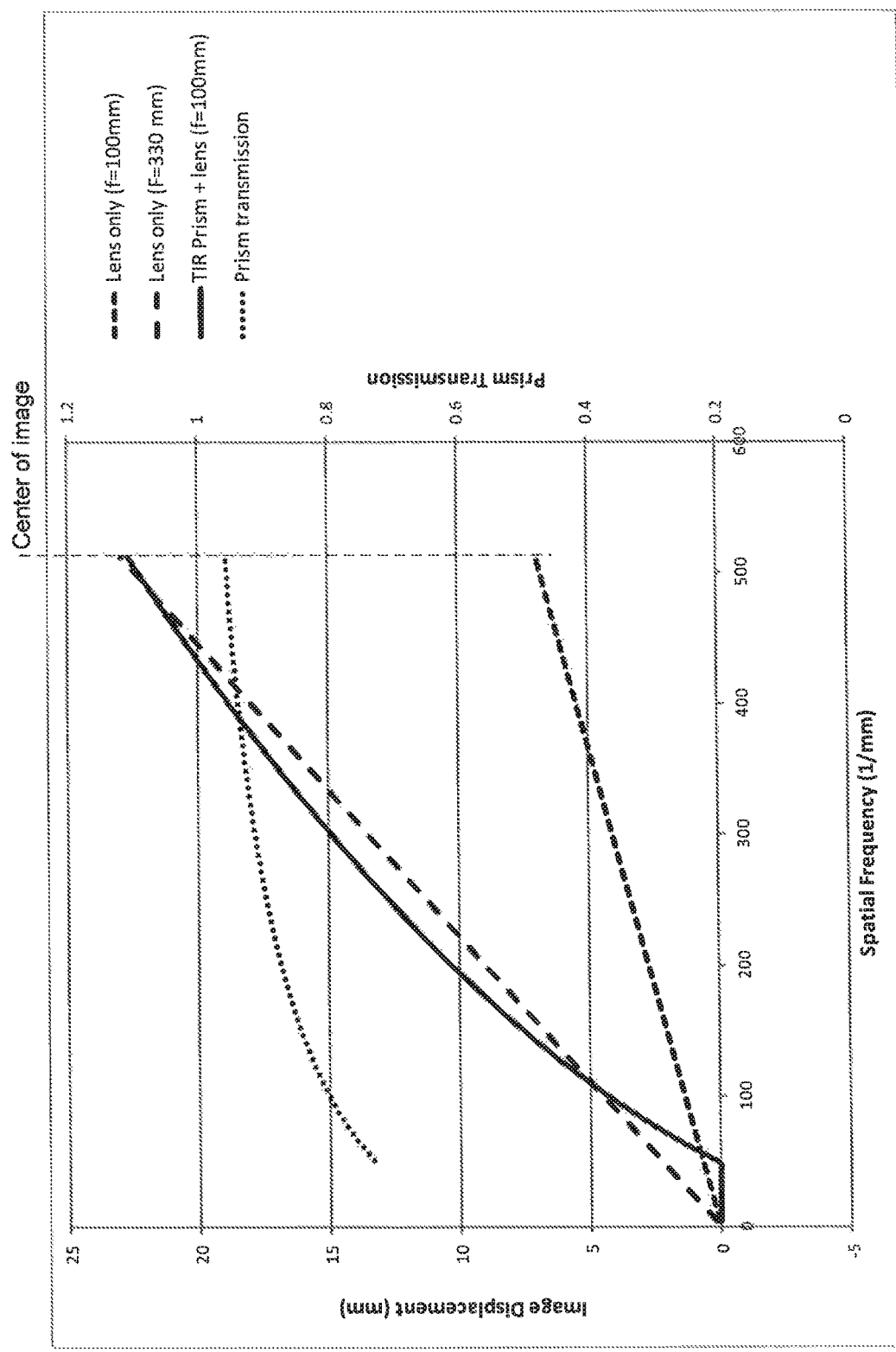
FIG. 12 is a graph of simulated results comparing the image displacement as a function of spatial frequency for different optical configurations for an image projector.
Figure 13:
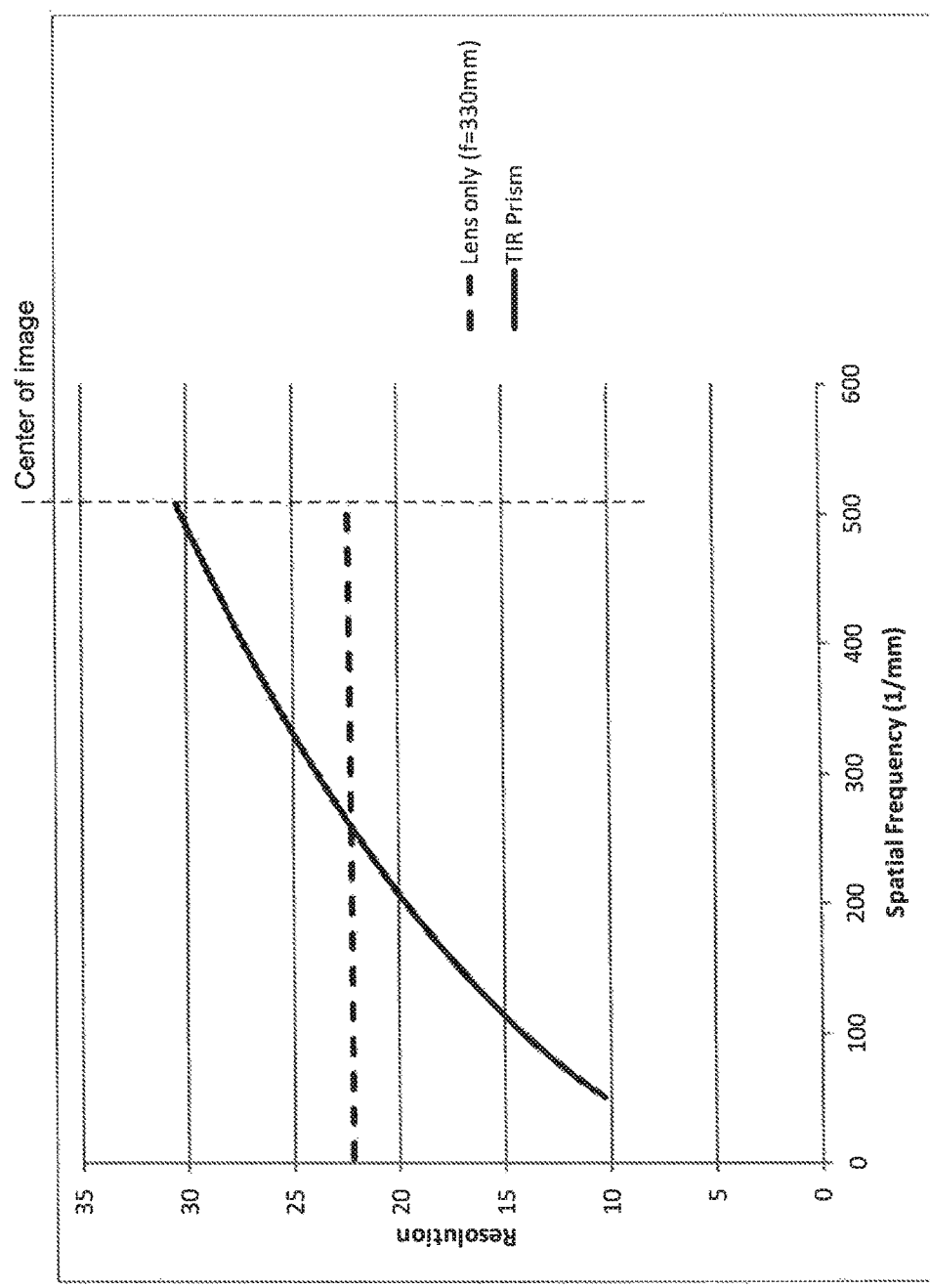
FIG. 13 is a graph of simulated results comparing the image resolution as a function of spatial frequency for different optical configurations for an image projector.

Pre-distortion steps 902 and 903 are interchangeable in order and can be effected by a single image transformation determined by a dispersion curve and intensity map of spatial frequencies of the desired image. Following these pre-distortion steps, at step 904, an appropriate phase (or phase and amplitude) matrix is determined to approximate the generation of the required target image in the Fourier domain of LCOS 25. This is achieved by performing a discrete space Fourier transform on the image data by, for example a method such as the Gerchberg-Saxton method outlined in Christmas et al involving fast Fourier transform algorithms. However, other techniques are known in the art. Finally, at step 905, appropriate voltages are applied to the pixels of LCOS 25 to produce the phase (or phase and amplitude) matrix. This includes accounting for calibration of LCOS in terms of voltage to phase curves for wavelength FIGS. 12 and 13 illustrate simulated results comparing different optical configurations for an image projector using an input wavelength of 700 nm, a coupling prism having a refractive index of 1.5 and an LCOS having 1028 pixels at 5 micron pitch. In FIG. 12, image displacement is compared with spatial frequency for a system utilizing a coupling (TIR) prism and Fourier lens of focal length 100 mm (solid line), a Fourier lens of 100 mm (dense dashed line) and a Fourier lens of 33 mm (sparse dashed line). The transmission of the spatial frequency components through the coupling prism is also graphed as the dotted line.

FIG. 12 clearly indicates that the coupling prism/lens combination provides similar performance to a system using a lens of much greater focal length without the increased space requirement.

FIG. 13 illustrates the resolution of the corresponding image displacement as a function of spatial frequency for the coupling prism/lens system compared with the 330 mm lens system. As illustrated, the resolution of the lens-only system is constant for all spatial frequencies while the prism/lens system provides increased resolution towards the center of the image. This variation in resolution is due to the enhanced angular magnification from the coupling lens.

Figure 14:
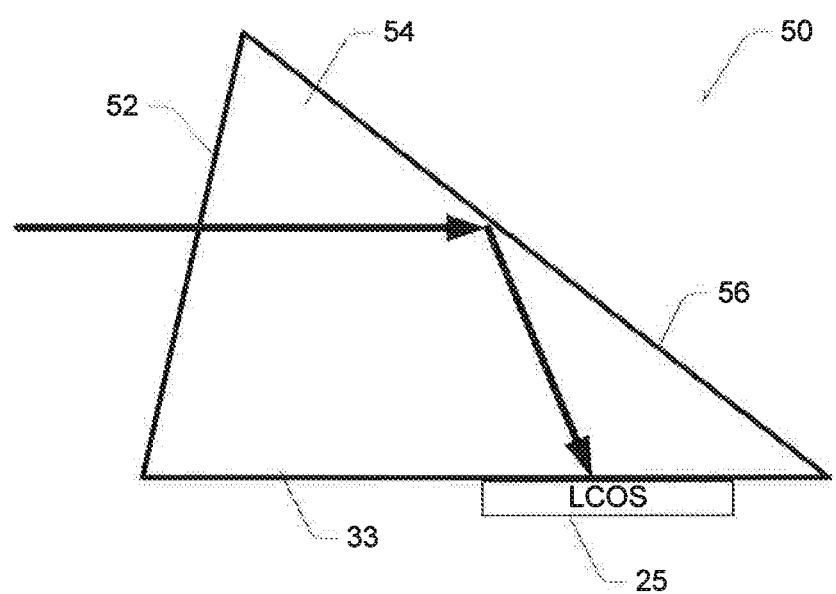
FIG. 14 is a schematic plan view of an alternative embodiment image projector showing the trajectory of an optical input beam.
Figure 15:
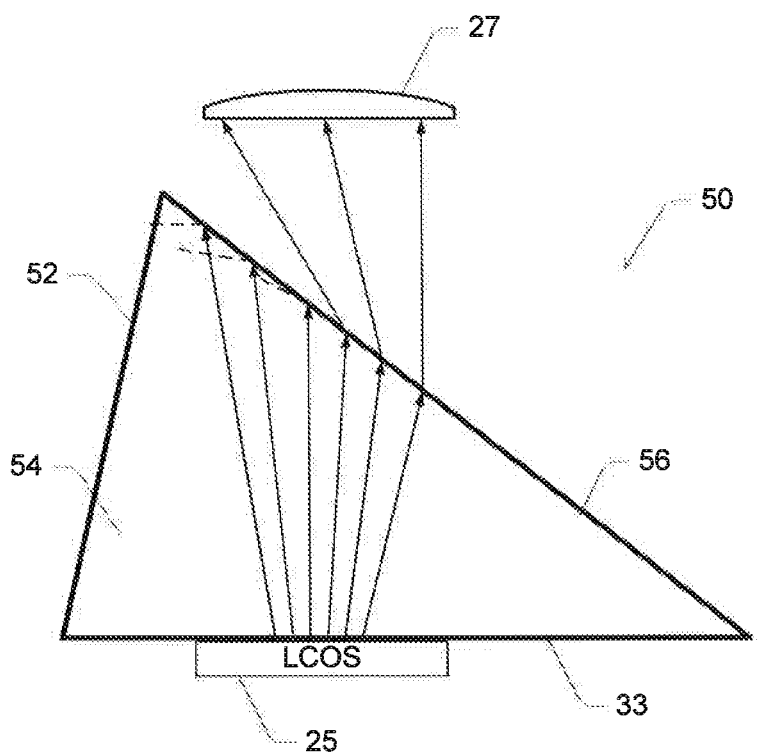
FIG. 15 is a schematic plan view of an alternative embodiment image projector showing the trajectory of diffraction components.

Referring now to FIGS. 14 and 15, there is illustrated an alternative embodiment image projector 50 in which the optical input beam is projected through an input surface 52 of a coupling prism 54 and reflected off only a first surface 56 of prism 54 before striking LCOS 25. As shown in FIG. 15, the resulting diffraction components are reflected back onto surface 56 where a subset are incident at an angle less than the critical angle for total internal reflection. This subset of diffraction components are transmitted to lens 27 where they undergo a spatial frequency-to-space conversion and are imaged at plane 9. The remaining diffraction components are reflected at surface 56, coupled out of prism 54 and subsequently not imaged.

In this embodiment, the particular diffraction components to be imaged is defined by the angle of incidence of the optical input beam, the geometry of prism 54 and the refractive index of prism 54. As the zero order diffraction component is not automatically separated from the other components, additional optics may be required to suppress or attenuate this high power component.

Conclusions

The invention is an improvement over existing LCOS based holographic projectors by significantly reducing the size, complexity and cost of the lensing system required to both remove the high intensity zero-order diffraction component and to do the angular magnification to allow a shorter throw distance. The invention can be implemented at very low cost and with very compact optics which, in some embodiments, can all be incorporated into one integral component. Very high suppression of the zero-order diffraction component (greater than 50 dB) can be easily achieved.

For vehicle HUD applications, the invention also allows for a significant enhanced horizontal image size, independent of magnification of the vertical image size. Further, the resolution of the central vision area can be made significantly higher than the resolution of peripheral areas which is ideal for best utilization of a limited number of driven pixels. The higher resolution central region is likely to have detailed instrumentation and instruction and the lower resolution peripheral regions provide vision for warnings and other less important indicia.

Monitoring of the separated zero-order diffraction component can easily be enabled for image optimization and for monitoring safety concerns. An emergency cutoff of the HUD can be implemented in response to detection of reduced zero-order detection (and therefore increased projected light).

The present invention also provides quality high-contrast imaging that is substantially free of flicker contrast artifacts. This is provided through the use of high quality analogue LCOS devices having pixels of dimension greater than or equal to 5 square microns. Analogue drive voltages provide much less phase ripple and much higher contrast than the digital drive signals. This can be especially useful for projections during night time driving and bright daylight conditions. Conventionally, increasing the contrast in LCOS projectors has focused on decreasing the pixel size. However, smaller pixels reduce the pixel capacitance, which affects the ability of the device to maintain an analog drive voltage over a frame. Furthermore, reducing the pixel size introduces a fringing field issue wherein the steering ability of the LCOS is significantly reduced.

Finally, the lack of need for an optical diffuser at the intermediate image plane allows for simple variable image plane depth perception.

Interpretation

It will be understood by one skilled in the art that the frequency and wavelength of a laser beam are connected by the equation:

Speed of light=wavelength*frequency.

As a consequence, when reference is made to frequency shifting, frequency converting, frequency broadening, different frequencies and similar terms, these are interchangeable with the corresponding terms wavelength shifting, wavelength converting, wavelength broadening, different wavelengths and the like.

Throughout this specification, use of the term "element" is intended to mean either a single unitary component or a collection of components that combine to perform a specific function or purpose.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

I claim:

1. An image projector for a holographic display system including an input light source for generating an at least partially coherent optical input beam and an imaging system for transforming an image representation in the Fourier domain into a corresponding holographic image in a spatial domain, the image projector including:
   a spatial light modulator having a reflective phase manipulation surface, the spatial light modulator being responsive to an electric control signal to generate a two-dimensional phase profile on the reflective phase manipulation surface to diffract the optical input beam into a diffracted beam having a plurality of diffraction components angularly separated in a first dimension; and
   a coupling prism having at least a first surface and being positioned such that at least a first subset of the diffraction components is refracted through the first surface to the imaging system;
   wherein upon refraction through the first surface, an angular separation of the first subset of diffraction components is increased by at least a factor of 2.

2. The image projector according to claim 1 wherein the coupling prism is positioned such that the optical input beam is incident onto the first surface at an angle in the first dimension equal to or greater than a critical angle for total internal reflection and reflected onto the spatial light modulator.

3. The image projector according to claim 2 wherein the coupling prism includes a second surface and wherein the optical input beam is reflected sequentially off the first and second surfaces at the critical angle for total internal reflection in a first dimension and coupled onto the spatial light modulator and a second subset of diffraction components is reflected off the first surface and refracted through the second surface.

4. The image projector according to claim 3 wherein the coupling prism is triangular in the first dimension having sides defined by the first and second surfaces and a third surface disposed adjacent the spatial light modulator.

5. The image projector according to claim 4 wherein the first subset of diffraction components represents negative orders of a diffraction pattern generated at the phase manipulation surface and the second subset of diffraction components represents positive orders of the diffraction pattern generated at the phase manipulation surface.

6. The image projector according to claim 5 wherein a zero order diffraction component is spatially separated from the first and second subsets.

7. The image projector according to claim 6 wherein the zero order diffraction component is reflected off both the first and second surfaces at the critical angle of total internal reflection.

8. The image projector according to claim 5 wherein the zero order diffraction component is coupled to a photosensor to monitor the power of the zero order diffraction component.

9. The image projector according to claim 8 wherein the photosensor is spatially offset from the input light source in a second dimension orthogonal to the first dimension.

10. The image projector according to claim 3 wherein the imaging system includes an optical power element and the coupling prism is positioned to refract the first and second subsets of diffraction components onto the optical power element to produce a holographic image in the spatial domain.

11. The image projector according to claim 10 wherein the second subset of diffraction components is refracted by the coupling prism directly onto a first region of the optical power element.

12. The image projector according to claim 11 including an angled mirror for reflecting the refracted first diffraction components to a second region of the optical power element.

13. The image projector according to claim 1 wherein the phase profile is a Fourier domain representation of the holographic image.

14. The image projector according to claim 13 wherein the phase profile includes a pre-distortion factor to at least partially compensate for distortion due to the coupling prism.

15. The image projector according to claim 1 wherein the phase profile includes a focusing factor to vary the position of the holographic image in the spatial domain along an optical axis.

16. The image projector according to claim 1 wherein the holographic image has a higher resolution in a central region and a lower resolution in peripheral regions.

17. A heads-up display system including an image projector according to claim 1.

18. A method of controlling an LCOS device to generate a diffraction profile for generating a corresponding holographic image from incident light, the method including the steps of:
 a) receiving image data corresponding to the desired holographic image, the image data including a two dimensional array of image intensities;
 b) distorting the image data to compensate for one or more of dispersion, nonlinear angular transformation of spatial frequency components, and a spatial inversion;
 c) determining a two dimensional phase matrix in the Fourier domain to approximate the holographic image; and
 d) deriving voltages to pixels of the LCOS device based on the determined phase matrix.

19. The method according to claim 18 wherein the step of distorting the image data includes swapping a spatial position of image data in a peripheral region of the array with image data in a central region of the array.

20. The method according to claim 18 wherein the step of distorting the image data includes increasing the intensity of image data in peripheral regions of the array.

21. The method according to claim 18 wherein the step of distorting the image data includes spatially compressing the image data as a function of distance from the center of the array.

22. The method according to claim 18 including the step:
 e) defining a blocking region at a central region of the array.

* * * * *